Figure 6:
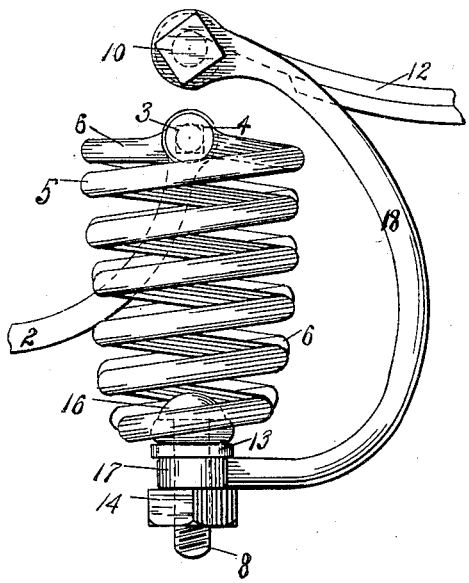

No. 807,612. PATENTED DEC. 19, 1905.
S. FURMIDGE.
VEHICLE SPRING.
APPLICATION FILED NOV. 16, 1904.
3 SHEETS—SHEET 1.
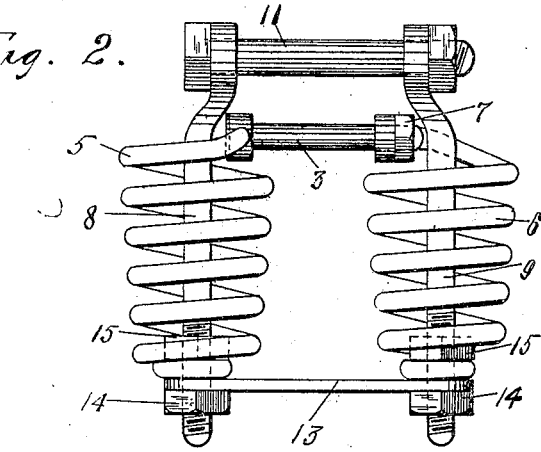
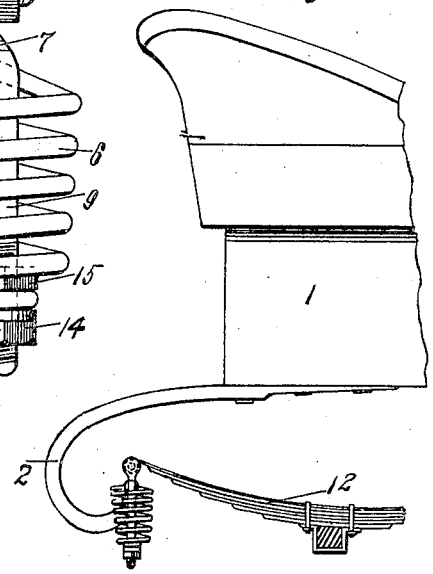
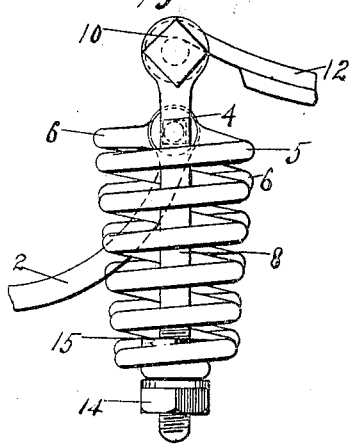
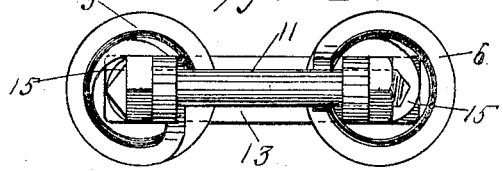
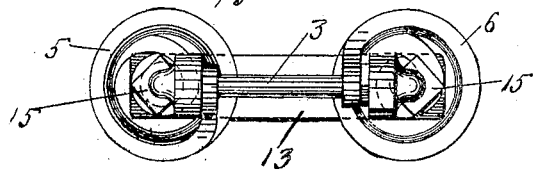
WITNESSES:
INVENTOR:
Samuel Furmidge,
BY Hugh K. Wagner
His ATTORNEY.

No. 807,612. PATENTED DEC. 19, 1905.
S. FURMIDGE.
VEHICLE SPRING.
APPLICATION FILED NOV. 16, 1904.

3 SHEETS—SHEET 2.

WITNESSES:
M. E. Letcher
Gladys Wallow

INVENTOR:
Samuel Furmidge,
BY Hugh K. Wagner
His ATTORNEY.

No. 807,612. PATENTED DEC. 19, 1905.
S. FURMIDGE.
VEHICLE SPRING.
APPLICATION FILED NOV. 16, 1904.

3 SHEETS—SHEET 3.

WITNESSES:
M. E. Letcher.
Gladys Wallow.

INVENTOR:
Samuel Furmidge,
BY
Hugh K. Wagner,
His ATTORNEY.

UNITED STATES PATENT OFFICE.

SAMUEL FURMIDGE, OF ST. LOUIS, MISSOURI, ASSIGNOR TO SUPPLEMENTARY SPIRAL SPRING COMPANY, OF ST. LOUIS, MISSOURI, A CORPORATION OF MISSOURI.

VEHICLE-SPRING.

No. 807,612.     Specification of Letters Patent.     Patented Dec. 19, 1905.

Application filed November 16, 1904. Serial No. 232,934.

*To all whom it may concern:*

Be it known that I, SAMUEL FURMIDGE, a citizen of the United States, residing at the city of St. Louis, State of Missouri, have invented certain new and useful Improvements in Vehicle-Springs, of which the following is a specification.

This invention relates to auxiliary or supplementary springs for automobiles or other vehicles. It is intended to relieve the rigidity of the other springs and accommodate the flattening of the half-elliptic springs. In the drawings it is shown in only one of its locations, where it may advantageously be used with reference to an automobile; but it will be understood that there are several such positions where it may be utilized.

Figure 7:
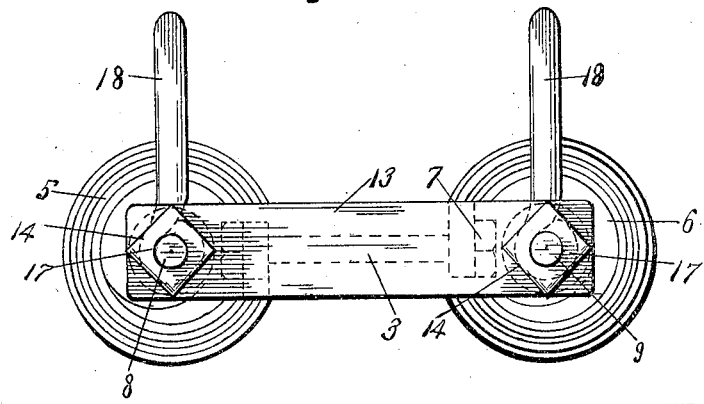
Figure 8:
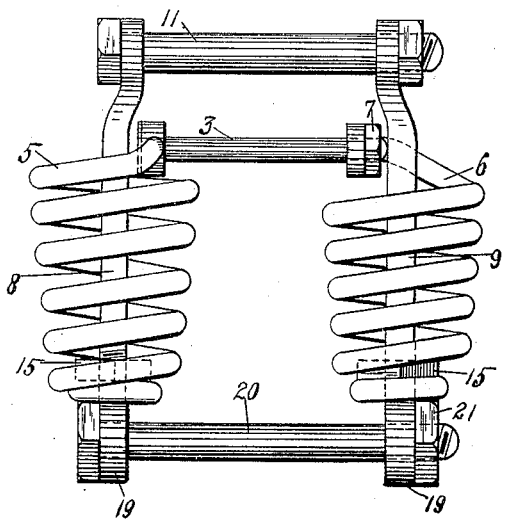
Figure 9:
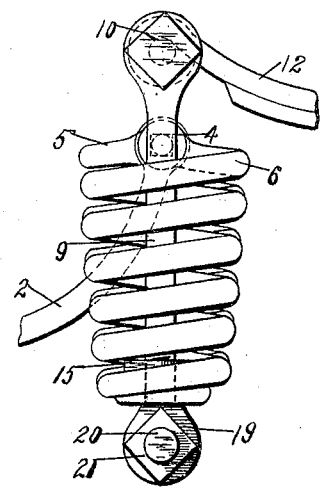

In the drawings accompanying this specification, in which like numbers of reference denote like parts wherever they occur, Figure 1 is a partial side elevation broken away of an automobile, showing the location of my supplemental spring in relation to the other springs of the vehicle. Fig. 2 is a front view of the same detached. Fig. 3 is a side view of the same on an enlarged scale, showing the springs which are attached thereto broken away. Fig. 4 is a top plan view. Fig. 5 is a top plan view with the top bolt removed. Figs. 6 and 7 show a modification in side elevation and bottom plan view, respectively; and Figs. 8 and 9 show another modification in front and side elevation, respectively.

The automobile-body 1 has suitably attached thereto and depending therefrom the curved leaf-spring or bracket 2, which curves upwardly and encircles the cross-bolt 3, being in pivotal connection therewith. Connected fixedly with said cross-bolt 3, which has at one end the square head or shoulder 4, is the bell-mouthed helical spring 5, which at its upper end is enlarged into a square eyelet fitting to the square bolt-head 4. The other end of the bolt 3 is screw-threaded and passes through an eyelet at the upper end of the twin bell-mouthed helical spring 6 and is held in that position by the nut 7. The pair of helical springs 5 and 6 are fixed at their bases in as rigid a manner as possible to the pair of vertical bolts 8 and 9, which are curved inwardly at their tops and enlarged to form eyelets 10, through which the upper cross-bolt 11 passes. The cross-bolt 11 holds the half-elliptic spring 12 in pivotal connection therewith, the end of the spring 12 encircling said bolt. At their lower ends the bolts 8 and 9 are tied together by the plate 13, which has perforations therethrough for the passage of said bolts. Beneath said plate 13 are the nuts 14, which press said plate closely against the lowest and smallest wind of the springs 5 and 6. Superimposed upon said lowest winds of the springs 5 and 6 is an additional pair of nuts 15, between which and the nuts 14 the lower portion of the springs 5 and 6 is held clamped. This holds the lower portion of the springs 5 and 6 very rigid and also ties them together by means of the plate 13. The lowest wind of each of the helical springs 5 and 6 is made so small that the opening through its center will just allow the passage of the bolts 8 and 9.

From the foregoing description it will be evident that when the weight is put upon the automobile-body 1 the spring 2, fastened to the bolt 3, will tend to compress the pair of helical springs 5 and 6. This weight will in turn be communicated, by means of the vertical bolts 8 and 9, to the half-elliptic spring 12, connected to the bolt 11. Thus when the semi-elliptic spring 12 flattens out and becomes longer the bolt 11 will be moved backward to accommodate the extension of the spring 12. In devices heretofore used for similar purposes no accommodation for the play of the vertical bolts 8 and 9, actuated by the cross-bolt 11, has been provided, with the result that the constant movement of same has acted like a saw to cut out the plates or other parts surrounding same. In my construction, however, this is entirely obviated because of the bell-mouthed form of the helical springs, which, opening wider at the top than at the bottom, allow a space amply large enough for all lateral motion for the pair of vertical bolts 8 and 9. At the same time, due to the fact that said bolts are in rigid connection with the base of the helical springs 5 and 6, there exists the constant tendency on the part of said springs 5 and 6 to return said bolts 8 and 9 to their normal and vertical position, in which latter movement they are assisted also by the semi-elliptic springs 12.

The essential feature of my invention is that the bolts 8 and 9 shall not abrade the helical springs 5, and this may be avoided not only by running the bolts through their center, as hereinabove described, but also by the use of the modification shown in Figs. 6 and 7. In these figures the bolts 8 and 9 are shown as shortened and held by their heads 16 against the lowest winds of the springs 5. Around the portion of said bolts 8 and 9 that projects beneath said springs 5 eyelets 17 on the ends of the side braces 18 encircle, and the braces 18 are secured to the bolt 11 in the same manner as the bolts 8 and 9 are in the principal figures.

In the modification shown in Figs. 8 and 9 the bolts 8 and 9 have eyelets 19 on their lower ends like the eyelets 10 at their upper ones. A bolt 20 is inserted through said eyelets like the bolt 11 at the top and takes the place of the plate 13, the loops of said eyelets 19 bearing tightly against the lowest winds of the helical springs 5 and 6, being held tightly thus by nuts 15 and the bolt 20 being retained in eyelets 19 by nut 21.

Although in the specification and claims reference has been made to semi-elliptic springs, yet it is obvious that this device can be readily employed in connection with full elliptic springs wherever that should prove desirable.

Having thus described my said invention, what I claim, and desire to secure by Letters Patent, is—

1. In an auxiliary or supplementary vehicle-spring, the combination of a means for connecting same with the vehicle-supporting spring, a separate means for connecting same with the leaf-spring, a pair of helical springs connected to said first-mentioned means, members rigidly connected to said helical springs connected also with said second-mentioned means, said helical springs being wide enough across the top to accommodate all lateral play of the parts in rigid connection therewith which connect same with the leaf-spring, substantially as described.

2. In a device of the character described, the combination with a vehicle-body of leaf-springs supporting same, semi-elliptic springs resting upon the axle, said leaf-springs and said semi-elliptic springs being connected by auxiliary springs, each of said auxiliary springs comprising a pair of helical springs, same being tied together at the top by the member to which is attached the end of the leaf-spring, a pair of bolts running through said helical springs and attached respectively to their lower ends, said bolts being connected at the top by the member to which the semi-elliptic spring is attached, said helical springs being of such circumference as to permit lateral play of said pair of bolts without abrasion, substantially as described.

3. In a device of the character described, the combination with the supporting and semi-elliptic springs of a vehicle of supplementary springs, each of said supplementary springs being characterized by the following parts: a member like a yoke to which the semi-elliptic spring is attached, a pair of helical springs in connection therewith, said member being actuated by said helical springs to return to its first position, and a separate member connected with said helical springs and to which the leaf-spring is attached, substantially as described.

4. In a device of the character described, the combination of a pair of helical springs, a bolt connecting same at the top, to which is attached the leaf-spring, a pair of bolts running vertically through said springs and tied at the bottom to each other and in rigid connection respectively with the pair of helical springs, said pair of vertical bolts inclining inwardly at their upper portion and holding the bolt to which is attached the end of another leaf-spring, said helical springs opening wider at the top than at the bottom, substantially as described.

5. In an auxiliary or supplementary vehicle-spring, the combination of means for connecting same with the vehicle-supporting spring, a separate means for connecting same with a leaf-spring, a pair of unenclosed helical springs connected to said first-mentioned means, members rigidly connected to said helical springs and connected also with said second-mentioned means in such manner as to avoid abrasion of said helical springs.

6. In a device of the character described, the combination with a vehicle-body of leaf-springs supporting same, semi-elliptic springs resting upon the axle, said leaf-springs and said semi-elliptic springs being connected by auxiliary springs, each of said auxiliary springs comprising a pair of helical springs, same being tied together at the top by the member to which is attached the end of the leaf-spring, a plurality of means connected to the lower ends of said helical springs, but sufficiently disjoined elsewhere therefrom to avoid abrasion thereof, said means being tied together at the top by a member to which is attached the end of the semi-elliptic spring.

7. In a device of the character described, the combination of an unenclosed helical spring or unenclosed helical springs, means for attaching same to the vehicle-body, means in rigid connection with the helical spring at one end thereof, but disjoined therefrom at the other, so as to prevent abrasion, and extending from one end to the other, by which same is attached to the leaf-spring.

8. A device of the character described, comprising a helical spring dissociated from parts liable to abrasion, means for attaching same to the vehicle, and means by which the device is connected to the leaf-spring, said means being in rigid connection with one end of said helical spring and extending to the other, and so disjoined from said helical spring and parts touching same as to avoid abrasion thereof and of said parts.

9. In a device of the character described, the combination of a pair of helical springs, a bolt connecting same at the top to which is attached a vehicle-supporting spring, a pair of bolts running vertically through said springs and tied at the bottom to each other and in close connection respectively with the pair of helical springs, said pair of vertical bolts extending above the bolt which connects the top of the pair of helical springs, and being connected by the bolt to which is attached one end of a semi-elliptic spring.

10. In a device of the character described, the combination of a pair of helical springs, a bolt connecting same at the top to which is attached a vehicle-supporting spring, a pair of bolts running vertically through said springs and tied at the bottom to each other and in close connection respectively with the pair of helical springs, said pair of vertical bolts extending above the bolt which connects the top of the pair of helical springs, and being connected by the bolt to which is attached one end of a semi-elliptic spring, said vertical bolts inclining inwardly at their upper portion, beginning adjacent said bolt which cross-connects the tops of said helical springs.

11. A device of the character described comprising a helical spring dissociated from parts liable to abrasion, having an eye turned on each end, means for attaching said helical spring to the vehicle, said means being connected to one of said eyes, and means in rigid connection with the other of said eyes by which the device is connected to the leaf-spring of the vehicle, said means extending from said point of rigid connection with said eye to the other end of the helical spring, and so disjoined from said helical spring and parts touching same as to avoid abrasion thereof and of said parts.

12. A device of the character described comprising a helical spring dissociated from parts liable to abrasion, having an eye turned on its upper end and another eye turned on its lower end, said eyes being disposed substantially at right angles to each other, means for attaching same to the vehicle connected to one of said eyes, and means in rigid connection with the other of said eyes by which the device is connected to the leaf-spring of the vehicle, said means extending from said point of rigid connection with said eye to the other end of the helical spring, and so disjoined from said helical spring and parts touching same as to avoid abrasion thereof and of said parts.

13. A device of the character described comprising a helical spring dissociated from parts liable to abrasion, having an eye turned on each end, a bolt fitting in one of said eyes, means pivotally connected with said bolt for attaching the device to the vehicle-body, a bolt in rigid connection at one end with the other of said eyes, and having an eye formed in its opposite end, means fitted into said last-mentioned eye for attaching the device to the leaf-spring of the vehicle, and a leaf-spring having means for pivotal connection with said last-mentioned means.

In testimony whereof I have affixed my signature in presence of two witnesses.

SAMUEL FURMIDGE.

Witnesses:
M. E. LETCHER,
GLADYS WALTON.